(12) United States Patent
Zlatnik et al.

(10) Patent No.: US 10,375,001 B2
(45) Date of Patent: *Aug. 6, 2019

(54) PERFORMING PREDEFINED ACTIONS BASED ON SCHEDULED USER EVENTS IN RESPONSE TO INCOMING EMAIL MESSAGES

(71) Applicant: CA, Inc., New York, NY (US)

(72) Inventors: Pavel Zlatnik, Prague-Brevnov (CZ); Daniel Samek, Ceska Lipa (CZ); Hana Doubkova, Prague (CZ)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/871,221

(22) Filed: Jan. 15, 2018

(65) Prior Publication Data

US 2018/0139163 A1    May 17, 2018

Related U.S. Application Data

(63) Continuation of application No. 14/203,357, filed on Mar. 10, 2014, now Pat. No. 9,882,853.

(51) Int. Cl.
*H04L 12/58*     (2006.01)

(52) U.S. Cl.
CPC .............. *H04L 51/18* (2013.01); *H04L 51/02* (2013.01)

(58) Field of Classification Search
CPC ....................................................... H04L 51/18
See application file for complete search history.

(56) References Cited

U.S. PATENT DOCUMENTS

| 2009/0228806 A1* | 9/2009 | Kadashevich | ......... | G06Q 10/10 |
| | | | | 715/747 |
| 2010/0121962 A1* | 5/2010 | Scott | ...................... | G06Q 10/10 |
| | | | | 709/228 |

* cited by examiner

*Primary Examiner* — Joe Chacko
(74) *Attorney, Agent, or Firm* — Meyertons, Hood, Kivlin, Kowert & Goetzel, P.C.

(57) ABSTRACT

A computing device, such as a network server or user terminal, automatically performs one or more predefined actions on inbound email messages responsive to receiving the inbound email messages. However, rather than base the performance of the actions on information manually provided to an email application by the user, the computing device retrieves event-related information stored in one or more calendar applications communicatively connected to the email application. The computing device then utilizes that information to perform the predefined actions. One example of such an action is automatically generating and sending an autoreply email message to the sender of the inbound email message.

18 Claims, 6 Drawing Sheets

PERFORMING PREDEFINED ACTIONS BASED ON SCHEDULED USER EVENTS IN RESPONSE TO INCOMING EMAIL MESSAGES

RELATED APPLICATIONS

This application is a continuation application of U.S. patent application Ser. No. 14/203,357, which was filed Mar. 10, 2014 and which is incorporated herein by reference in its entirety.

BACKGROUND

The present disclosure relates to email messaging on computer systems, and particularly to performing predefined actions based on events scheduled in a user's calendar application upon receiving inbound email messages.

Many people commonly use email for communicating digital messages. As such, there are a great many different types of email applications available for users. Some of the more well-known email applications include those known under the trademarks MICROSOFT OUTLOOK and GMAIL, but most email applications offer a wide variety of features for users in addition to the typical send/receive capability.

One such feature is the "autoreply" feature, which is particularly useful for letting all senders know that the user is currently not able to respond to the incoming email messages. With this feature, the user manually creates the body of an "autoreply" email message. The body may comprise text indicating, for example, that the user cannot currently reply to incoming email messages personally. In some cases, the text may also indicate when the user expects to be able to respond to incoming emails. The user also creates a rule within the context of the email application that defines how incoming messages are to be treated. Thereafter, in accordance with the rule, the email application autonomously sends the autoreply message to the sender each time it receives an inbound email message.

BRIEF SUMMARY

The present disclosure provides a computer-implemented method, an apparatus, and a computer-readable medium for automatically performing one or more predefined actions (e.g., generate and send an autoreply email message, forward the inbound email message to another destination address, etc.) in response to receiving inbound email messages. However, rather than perform such actions based on information manually provided to an email application by the user, as is conventional, the present disclosure performs the actions autonomously utilizing information stored in one or more calendar applications communicatively connected to the email application. Particularly, the present disclosure determines whether any scheduled events associated with the user are currently active, and if so, performs a predefined action based on the information associated with the active user event.

Accordingly, one embodiment of the present disclosure provides a computer-implemented method comprising receiving, at an email application executing on a computing device, an incoming email message addressed to a user. The email application is communicatively interfaced to a calendar application associated with the user and defines a filter for the incoming email message. Responsive to receiving the incoming email message, the method calls for retrieving event information from the calendar application. The event information, in this embodiment, comprises an identifier that identifies a predetermined action to be performed by the email application when processing the incoming email message. Based on this event information, the method determines a prioritized execution order for the predetermined action and the filter, and then executes the predetermined action and the filter in the prioritized execution order when processing the incoming email message.

In another embodiment, the present disclosure provides a computing device that executes an email application communicatively interfaced to a calendar application associated with the user. In this embodiment, the email application also defines a filter for processing the incoming email message. The computing device comprises a communication interface circuit and a programmable processing circuit. The communication interface circuit is configured to receive an incoming email message addressed to a user. The processing circuit, which executes the email application, is configured to retrieve event information from the calendar application responsive to receiving the incoming email message. The event information comprises an identifier that identifies a predetermined action to be performed by the email application when processing the incoming email message. The processing circuit also determines a prioritized execution order for the predetermined action and the filter based on the event information, and executes the predetermined action and the filter in the prioritized execution order when processing the incoming email message.

In another embodiment, the present disclosure provides a computer readable medium configured to store an email application. When executed by a computing device, the email application configures a programmable processing circuit associated with the computing device to receive an incoming email message addressed to a user. Notably, the processing circuit communicatively interfaces the email application to a calendar application associated with the user. Further, the email application defines a filter for the incoming email message.

In one embodiment, responsive to receiving the incoming email message, the email application controls the processing circuit to retrieve event information from the calendar application. In this embodiment, the event information comprises an identifier that identifies a predetermined action to be performed by the email application when processing the incoming email message. Once the event information has been received, the email application determines a prioritized execution order for the predetermined action and the filter based on the event information, and then executes the predetermined action and the filter in the prioritized execution order when processing the incoming email message.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a computer-implemented method, a corresponding computing device, and a computer-readable medium for performing one or more predefined actions in response to receiving an inbound email message. Such actions may include, but are not limited to, automatically generating and sending an autoreply email message to the sender of an inbound email message. However, rather than perform the predefined actions based on information manually provided to an email application by the user, a computing device configured according to the present disclosure autonomously retrieves information stored in association with one or more calendar applications communicatively connected to the email application, and performs the predefined action or actions utilizing that retrieved information.

This method of autonomously performing predefined actions provides a variety of benefits over conventional methods. For example, consider a situation in which a user will be away from the office and wishes to reply to inbound email messages using the autoreply feature of his/her email application. With conventional methods, the user must manually prepare a different autoreply message template that will be sent to the sender each time the user will be away from the office. Further, each template is conventionally a "one-size-fits-all" message that addresses all inbound email messages indiscriminately. The present disclosure, however, identifies groups or types of events that are of a similar nature, and utilizes the data and information that is stored within a calendar application associated with the user to generate the autoreply email message for such groups. Therefore, the user is no longer constrained to manually defining a single, "one-size-fits-all" message within the context of the email application for automatically replying to all incoming messages.

In another benefit, the present disclosure allows a user to better control how inbound emails are directed based on his/her scheduled events. For example, a user may "schedule" a commute to/from work, a travel destination, or even define a plurality of state and federal holidays in his/her calendar application. The user may also define a "rule" in an email application program to forward inbound emails received during these scheduled travel times to a predefined destination address. This would allow a user to always ensure that emails are received and handled during those times when the user is not able to personally reply to an inbound email message. Moreover, which actions are performed upon receiving an inbound email message may be selective, thereby allowing the user to specify how inbound email messages are handled. For example, in one embodiment, the present disclosure allows a user to forward inbound email messages and/or generate autoreplies to inbound messages received from predefined contacts.

Figure 1:
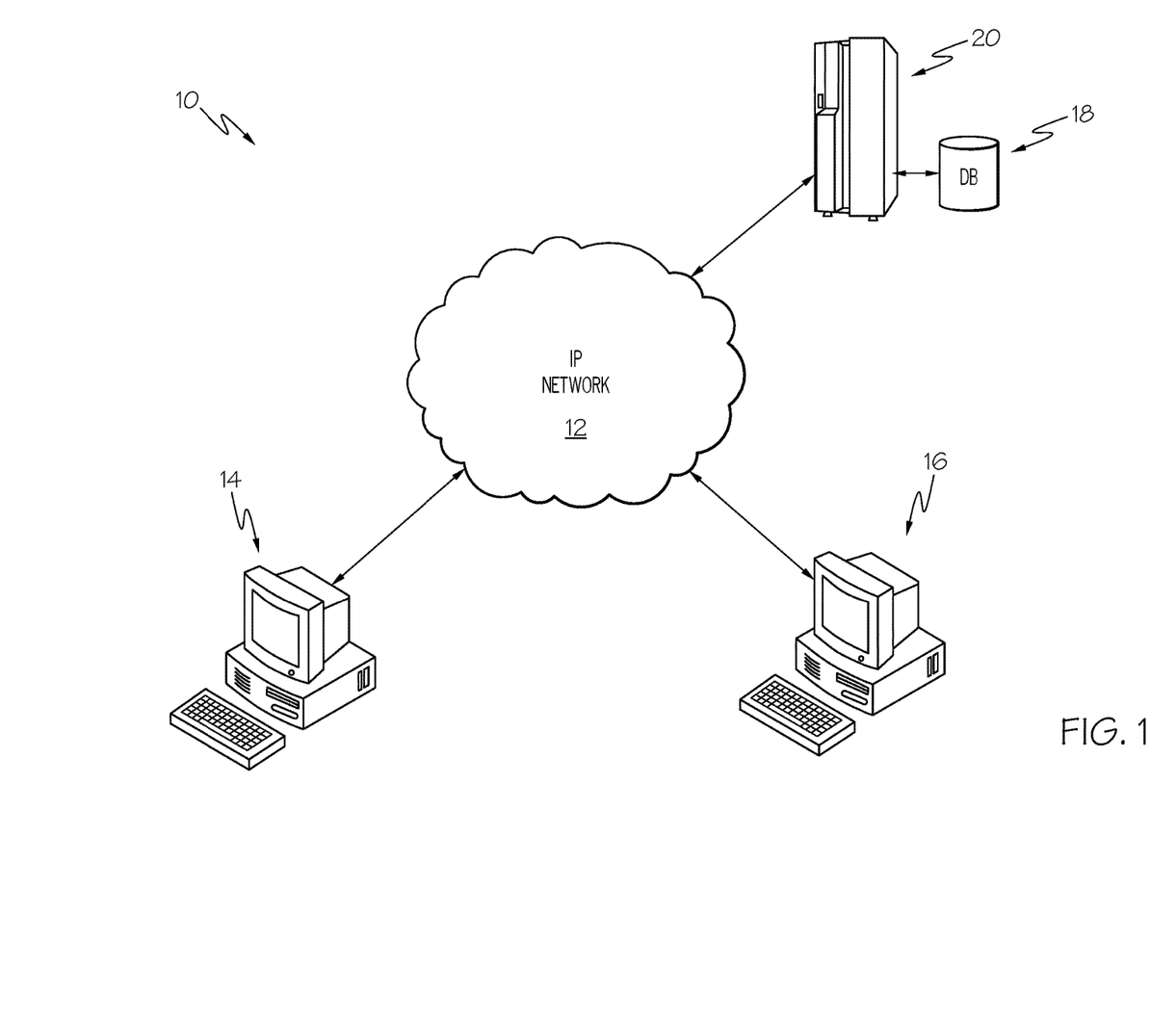
FIG. 1 is a block diagram illustrating a communications network configured to function according to one embodiment of the present disclosure.

Turning now to the drawings, FIG. 1 is a block diagram of a computer network 10 configured according to one embodiment of the present disclosure. As described herein, embodiments of the present disclosure are described in the context of automatically generating an autoreply email message upon receiving an inbound email message. However, those of ordinary skill in the art should appreciate that this is for illustrative purposes only, and that the present disclosure is not so limited. As described in more detail later, embodiments of the present disclosure also contemplate automatically performing other predefined actions upon receiving an inbound email message, and utilizing scheduled event information retrieved from a calendar application.

As seen in FIG. 1, network 10 comprises one or more communications networks, such as IP network 12, over which a plurality of user terminals 14, 16 communicate data with one another. In this embodiment, the user terminals 14, 16 communicate data in email messages over the Internet. Therefore, both user terminals 14, 16 execute client email applications locally. In addition, however, user terminal 16 also utilizes a server-based email application program executing on server 20 that may be communicatively connected to a database (DB) 18.

Such server-based email applications may be any known email application program used for composing and delivering email. Such programs include, but are not limited to, those known under the trademarks MICROSOFT OUTLOOK, HOTMAIL, and GMAIL. Generally, server-based applications receive email messages sent by a sending party (e.g., user terminal 14) that are intended for a receiving party (e.g., user terminal 16). Upon receipt, the server-based email application filters the inbound email messages and forwards them to the intended user's inbox. In some cases, where it is necessary, the server-based email application generates and returns an autoreply email message to the sender before delivering the email message to the intended recipient.

Figure 2:
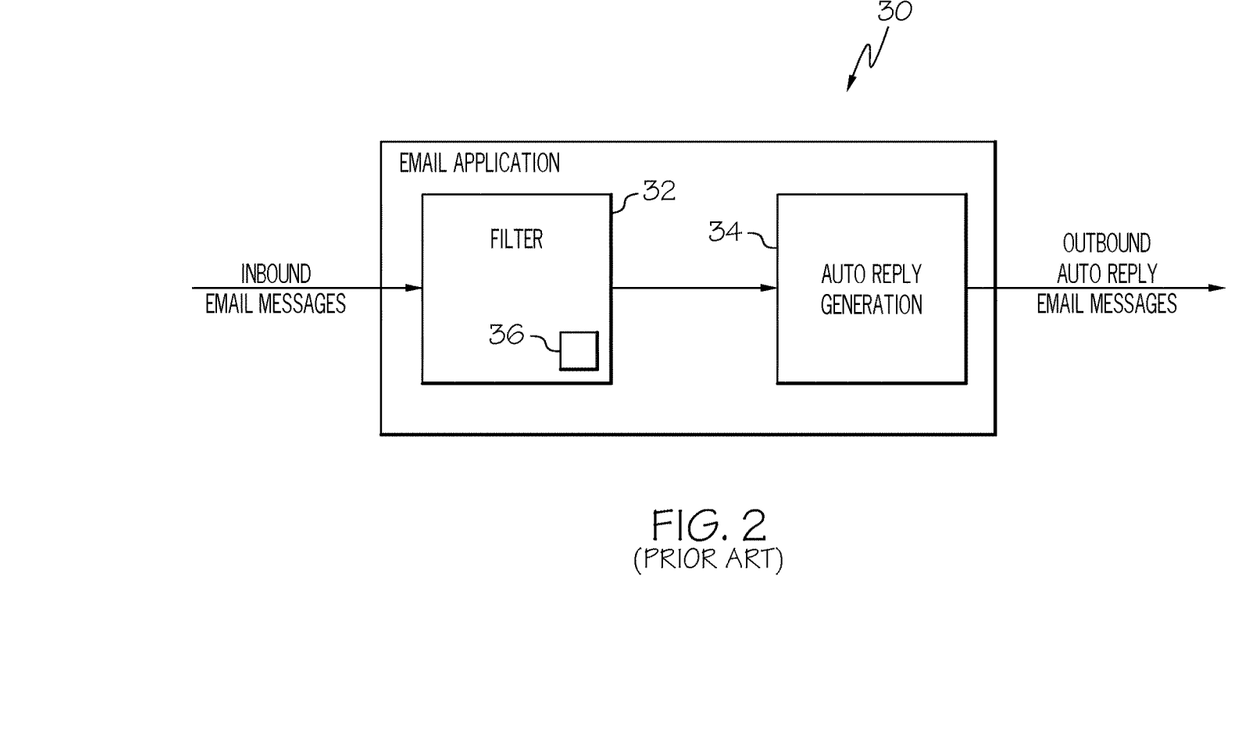
FIG. 2 is a block diagram illustrating some functional components that comprise a conventional email application.

FIG. 2 is a block diagram illustrating, generally, how the component functions of a conventional email application program 30 interact to apply different "rules" or "filters" applied by a user. As seen in FIG. 2, inbound email messages are received at the email application program 30 and "filtered" using filter logic 32. The filter logic 32 comprises the hardware and/or software needed to organize incoming email messages in accordance with specified criteria. In FIG. 2, the criteria are embodied as a set of predetermined "rules" 36 that may be defined or refined by the user. A rule is an action that is automatically performed by the email application 30 upon receiving an inbound email message, or upon sending an outgoing message, based on user-specified conditions. Generally, users are able to create such rules by selecting one or more predetermined parameter values provided by the email application 30.

In more detail, inbound email messages received by the filter logic 32 are generally sent to a user's "Inbox." However, in accordance with the one or more rules 36, the inbound messages may be processed differently. For example, a first rule 36 may cause filter logic 32 to route all inbound email messages from a specified domain to some other folder (e.g., a spam folder) instead of the Inbox. Another rule 36 may cause filter logic 32 to forward a copy of the inbound email to some other predefined email address. Additionally, email messages may be selectively processed or routed based on whether they contain specified words.

In some cases, the rules 36 may cause the filter logic 32 to trigger an autoreply generator logic component 34. Particularly, the autoreply generator logic 34, which may also comprise hardware and/or software, is configured to automatically generate a reply message and send that message to the sender. The autoreply email message may indicate, for example, that the intended recipient is away from the office, and will return by a specified date. In this manner, the sender of the email message is aware that he/she may not receive a timely reply. Such features are handy, for example, when a user will be on vacation and unable to access email.

However, with conventional email applications 30, a user must create custom rules 36 for each occurrence of each different event. For example, when a user goes on a first vacation, the user must generate a custom rule and autoreply message template to cover the time the user will be away. However, the user must also generate a new rule and a new autoreply message template separately for each subsequent time the user goes on vacation. Similarly, if a user enters important meetings and does not want to be disturbed, the user would have to generate a custom rule and autoreply message template to cover the user each time the user enters a meeting.

Information regarding these events, however, is usually entered into a calendar application by the user. Nevertheless, conventional email applications 30 are not able to access such calendar applications 50, or their data. Thus, conventional email applications, such as email application 30, are generally unable to leverage the event data that is stored with the calendar application 50, and therefore, are unable to process inbound emails in accordance with user events that are active at the time the inbound email messages are received. Accordingly, the present disclosure provides a method for utilizing this calendar information to the user's advantage with respect to performing actions in response to receiving email messages.

Figure 3:
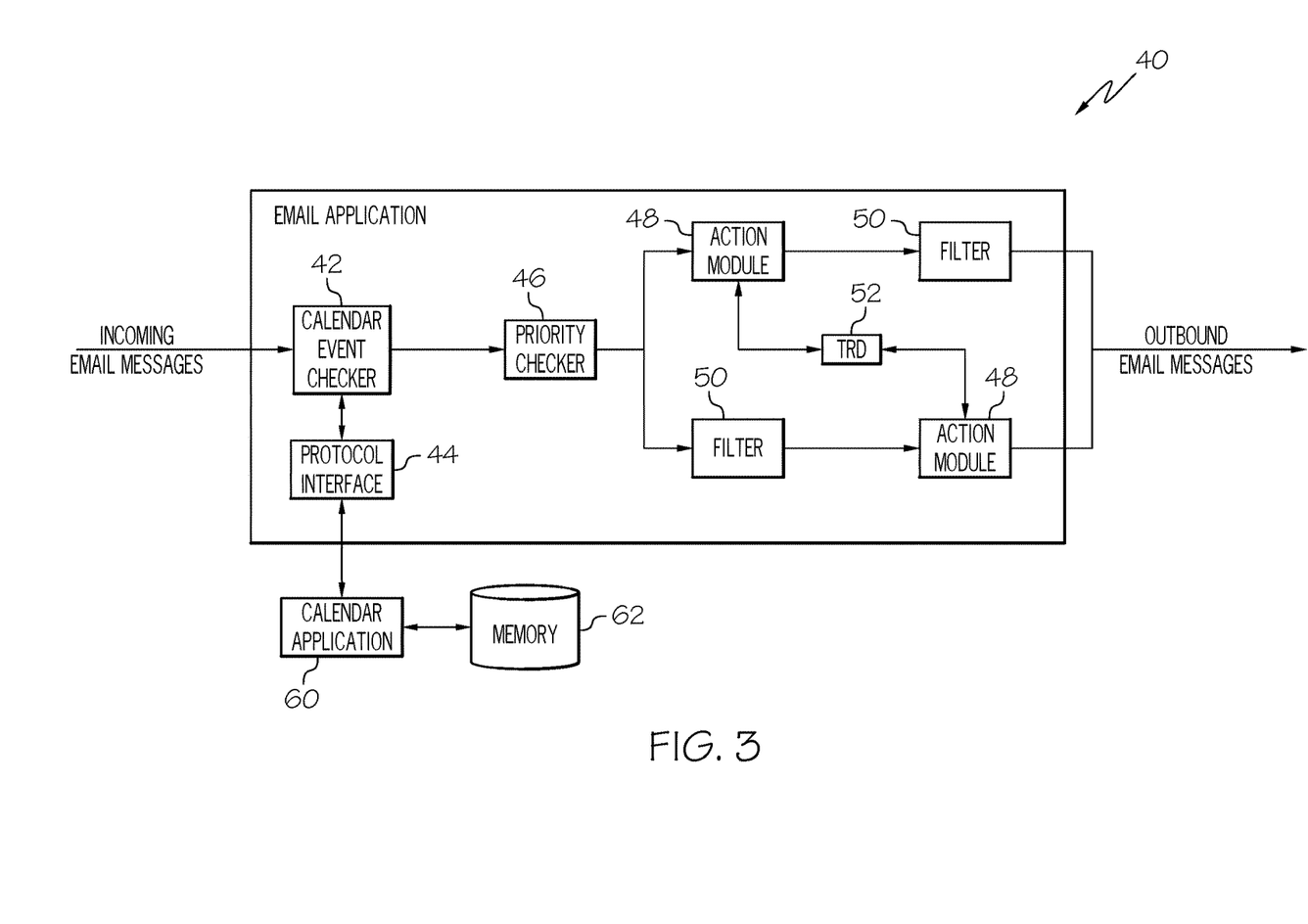
FIG. 3 is a block diagram illustrating some functional components that comprise an email application configured according to one embodiment of the present disclosure.

FIG. 3 is a block diagram illustrating some functional components of an email application 40 configured according to one embodiment of the present disclosure. As seen in FIG. 3, the email application 40 comprises a calendar event checker 42, a protocol interface 44, a priority checker 46, an action module 48, a filter 50, and a set of templates, rules, and data (TRD) 52 defined by a user of the email application 40, the email application 40, or both. Each of these components seen in FIG. 3 may be implemented as hardware circuitry, or a combination of both software and hardware circuitry.

The event checker 42 receives inbound email messages sent by remote users, such as user 16, via network 12. Upon receiving the email messages, the event checker 42 accesses a calendar application 60 associated with the user, and determines whether there are any active events for the user. For example, in one embodiment, the event checker 42 generates a request message identifying the user responsive to receiving the incoming email message, and sends the request message to the calendar application 60. The request message directs the calendar application 60 to indicate whether an event is currently active for the user, and if so, to provide information and data associated with that currently active event. Such information and data may be stored, for example, in memory, such as a database 62, accessible to the calendar application 60. Table 1 provides some examples of the information and data that may be associated with a given event and provided to the event checker 42 by the calendar application 60 according to one embodiment.

TABLE 1

| DATA ASSOCIATED WITH A GIVEN CALENDAR EVENT | MEANING |
| --- | --- |
| Event ID | An identifier that uniquely identifies the event. |
| Event Type ID | A value that identifies what type of event the currently active event is (e.g., VACATION, MEETING, FEDERAL HOLIDAY, STATE HOLIDAY, etc.). |
| Action Indicator | A value that indicates which specific user-defined action, if any, is to be used to process the incoming email message. |
| TRD | Data associated with the action to be performed (e.g., a list of addresses and/or user IDs to be used when action is to forward an inbound email message to specified recipients). |
| Filter Indicator | A value that indicates a specific filter, if any, that is to be used to process the incoming message. |
| Priority Indicator | A value that identifies whether a user-defined action, or a specific filter, should be applied first to the incoming message. |

Of course, the list of data in Table 1 is not exhaustive, and other information and data not expressly identified herein may also be returned in the response message as needed or desired.

Responsive to receiving the request message, the calendar application 60 accesses the data in database 62 and determines whether there are any currently active events associated with the user. If so, the calendar application 60 retrieves the data associated with the active event, generates a response message to include the retrieved data, and sends the response message to the event checker 42 via the protocol interface 44.

The email application 40 and the calendar application 60 may, in some cases, be associated with disparate protocols. Such may be the case, for example, when the email application 40 and the calendar application 60 are manufactured by different vendors. Therefore, in at least one embodiment of the present disclosure, the protocol interface 44 facilitates communication between the email application 40 and the calendar application 60. The protocol interface 44 can be any type of interface needed or desired, but generally comprises the hardware and software needed for converting the messages, data, and information between a format understood by the email application 40 and a format understood by the calendar application 60.

The priority checker 46 is configured to determine how the inbound email message should be processed, as well as to effect that processing. In one embodiment, for example, the priority checker 46 determines whether the email application 40 should perform a predefined user action on the inbound email message before filtering the inbound email message, or alternatively, should filter the inbound email message before performing a predefined action on the inbound email message. The decision on which process has priority over the other is determined, in one embodiment, on the Action Indicator provided by the calendar application 60.

Particularly, when creating an event, the user would identify an action (e.g., delete the inbound message, generate an autoreply message, forward the message, etc.), if desired, that is to be performed on an inbound email message. Similarly, the user could also, if desired, indicate a filter that is to be used to process the inbound email message. In some cases, the user may define both an action and a filter for the inbound email messages. However, when both are defined, there could be a conflict when executing one before the other. Therefore, the Action Indicator is simply a user-defined value (e.g., "ACTION" or "FILTER") that identifies which of those two processes should occur first. The Action Indicator value is intended to reduce or eliminate any ambiguities in the processing of a given inbound email message.

For example, consider an inbound email message in which the user indicates that all inbound messages from specified domains should be deleted. However, the user may also specify that copies of the inbound email messages sent from a particular sender or domain should be moved to a predetermined folder. In such cases, performing the predefined action first (i.e., deleting the email message) would cause problems for the filter 50. Specifically, there would be no email message to filter 50 since the inbound email message was deleted. In these cases, the priority checker 46 would be configured, based on the Activity Indicator value provided by the event checker 42, to forward the email message to filter 50 before the action is taken on the email message by action module 48. Thus, a copy of the email message would first be placed in the predetermined folder, provided it was sent by a pre-identified person or from a predefined domain as defined by filter 50, and then subject to deletion performed by the action module 48. In other cases, where it does not matter if an action is performed first, a given email message may be marked as important (i.e., an action performed by the action module 48) and then moved to a predetermined folder based on the filter 50 processing.

The action module 48 comprises the hardware circuitry, or combination of hardware circuitry and software, required to perform a predefined action on an inbound email message. The action is specified by the user and provisioned in the calendar application 60, identified in the Event ID data parameter sent by the event checker 42, and executed to perform its function(s) according to the set of templates, rules, and data in TRD 52. The TRD 52 may comprise any information needed or desired, but is generally utilized by the action module 48 when performing its function. As stated above, the predefined action may be the generation and sending of an autoreply email message to the sender of the inbound message; however, as described in more detail below, other actions are also possible.

The filter 50 processes the inbound email messages based on predetermined criteria sent with the inbound email message. For example, the filter 50 may process the inbound email message based on the identity of the sender, or on whether the message has a specific subject in the subject line. Based on the filter results, the email application 40 may perform some action on the email message.

Figure 4:
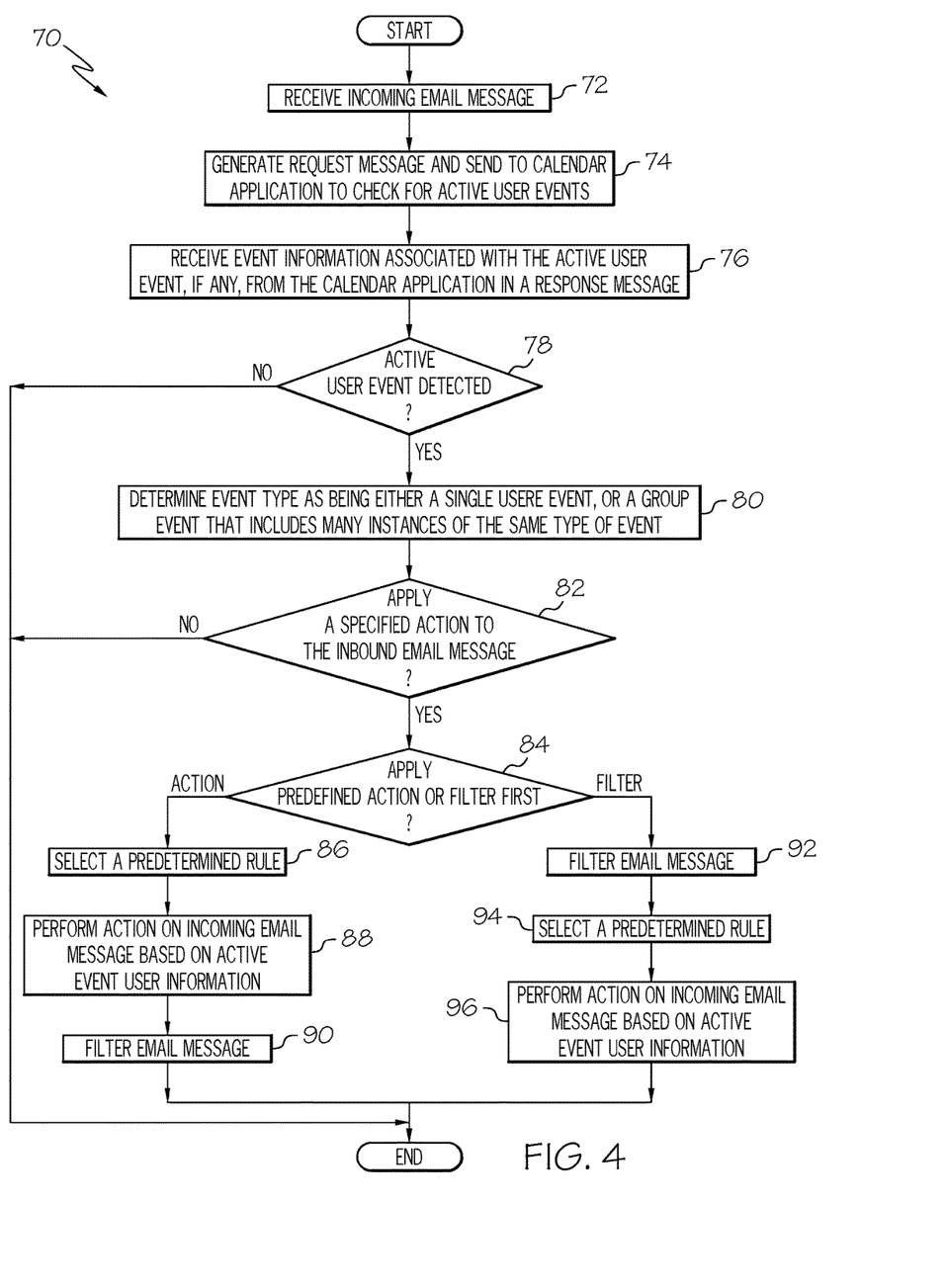
FIG. 4 is a flow diagram illustrating a method for generating an autoreply email message in accordance with one embodiment of the present disclosure.

FIG. 4 is a flow diagram illustrating a method 70 by which an email application program 40 configured according to an embodiment of the present disclosure interfaces with calendar application 60 to generate an autoreply email message. It is assumed for clarity that a user has already provisioned the calendar application 60 with a particular user event (e.g., a two week long vacation), as well as a rule and an autoreply template message within the context of the email application 40.

Method 70 begins with the email application 40 receiving an inbound email message from a sender (box 72). Upon receiving the email message, the event checker 42 generates and sends a request message to the calendar application 60 to determine whether there are any events that are currently active for the user (box 74). For example, the request message may comprise a query as to whether any scheduled user events are currently on-going, and may include a username or user ID that identifies the user. The request message may also incorporate the user's password, where needed.

In one embodiment, the request message is sent through the protocol interface 44 that converts the request message from a format that is understood by the email application 40 into a format that is understood by the calendar application 60. However, those of ordinary skill in the art will appreciate that such an interface 44 may not be needed in cases where the email application 40 and the calendar application 60 may communicate using compatible message formats.

In response, the event checker 42 receives a response message from the calendar application 60 that may comprise data and information indicating whether any events are currently active for the identified user (box 76). In one embodiment, the information and data included in the response message is associated with the current event. If the event checker 42 determines, that no events are currently active based on the data in the response message, the method 70 ends and the inbound email message is handled conventionally by email application 40. However, if the response message from calendar application 60 indicates that an event is active (e.g., that the user is currently on vacation), the event checker 42 will pass the data and information received in the response message to the priority checker 46.

The data and information received in the response message from the calendar application 60 may include any information known in the art. However in one embodiment, the information in the response message comprises the data and information described previously in Table 1. As stated above, the information may comprise an Action Indicator indicating the priority of the event to the user, as well as an Event Type ID intended to indicate whether the event occurs only once (e.g., a vacation, holiday, or a telephone call), or whether the event will reoccur in the future (e.g., weekly status update meeting calls). Of course, this list is not exhaustive, and other data and information may be provided to the event checker 42 by calendar application 60 as needed or desired.

The event checker 42 then passes the information and data to the priority checker 46. In one embodiment, the priority checker 46 determines, based on the information returned in the response message, an event type for the active event. That is, the priority checker 46 determines whether the active event is a single, unique event that rarely, if ever, reoccurs (e.g., "Telephone call with Sam"), or whether the event is one of many events of the same type (e.g., vacation events, meeting events, commute events, holidays, etc.) (box 80). To accomplish this determination, the priority checker 46 may analyze the Event Type ID parameter that was returned in the response message to determine the particular type of event. A value of "TELEPHONE CALL" might be interpreted as a single event by priority checker 46, while a value of "VACATION," "COMMUTE," "FEDERAL HOLIDAY," or "MEETING" may be interpreted as a group event by priority checker 46. Alternatively, the data in the response message could comprise an explicit parameter that identifies the active event to the priority checker 46 as being either a single or group event. However, in the latter cases, the user may have to identify the event as being a single event or a group event when provisioning the calendar application 60 with scheduled event data.

Once the event type has been determined, the priority checker 46 determines whether an action exists for that event type based on the value contained in the Action Indicator (box 82). For example, the user may not have created an action for a single type event such as a telephone call. In such cases, the Action Indicator may be empty, or have a specified value. Method 70 may then simply end and the email application 40 would handle the inbound email message normally. However, if the user did create an action for the event type, the priority checker 46 could use the value in the Action Indicator to identify the appropriate action to apply to the inbound email message from the value in the Action Indicator parameter (box 84).

In this embodiment, the Action Indicator identifies a particular autoreply email message template to return to the sender of the inbound email message. For example, if the Event Type Indicator received from the calendar application 60 indicates that the user is currently on vacation, the Action Indicator might specify an action (e.g., generate and send an autoreply message) created by the user specifically for vacations. The specific template to use in the identified action could be identified in the TRD parameter, for example. Alternatively, if the Event Type Indicator indicates that the user is currently in a meeting or on a commute, the Action Indicator might specify an action that was created by the user specifically for meetings or commutes.

The priority checker 46 then analyzes the Priority Indicator to determine, if necessary, whether the action module 48 or the filter 50 should be called first to continue processing the inbound email message (box 84). This helps the email application 40 to avoid conflicts between the action module 48 and the filter 50. If the priority checker 46 determines that the action should be performed prior to filtering, the priority checker 46 calls the action module 48.

The information received by the priority checker 46 is also passed or otherwise made available to the action module 48. The action module 48 then selects and retrieves the predetermined action from TRD 52 (box 86), performs the action in accordance with the templates, rules, and data included in the TRD 52 (box 88), and then passes the inbound email message to the filter 50 for filtering (box 90).

Alternatively, if the priority checker 46 determines that the inbound email message should be filtered prior to performing an action on the email (box 84), the priority checker 46 will pass the inbound email message to filter 50 for filtering (box 92). Once the filter 50 has completed its processing, the filter 50 then passes the inbound email message to the action module 48, which selects the predetermined action from TRD 52 (box 92) and performs the action in accordance with the templates, rules, and data included in the TRD 52 (box 96). Once complete, the method 70 ends, for example, with the email application sending an autoreply email message to the sender of the inbound email message.

As a practical example, consider a user that created a vacation event type autoreply message template to state where the user is, or what the user is doing, and when the user is expected back (e.g., "I'm currently on vacation, and will return to the office on Jul. 10, 2014"). For meeting event types, the autoreply message template may reflect when the meeting will end and whom to contact for an emergency (e.g., "I'm currently in a meeting and will not be reachable until 4:00 pm. If you need immediate assistance, please contact my assistant at 800-555-0192 or assistant@company.com"). In each case, the data and information that is included in the autoreply email message may be provided by the calendar application 60 (e.g., contained in the TRD parameter) rather than from the email application 40. Thus, the user need only to generate a single autoreply message template for all vacations via the email application 40 with the calendar application 60 providing the data that is used to populate the information in the autoreply message.

Those skilled in the art should readily appreciate that method 70 may also be used to perform other types of user notifications. For example, in one embodiment, the action module 48 may determine one or more predefined addresses for forwarding an inbound email message and/or the message generated by the action module 48. In these embodiments, the user would provision the event with the address information when creating the event. The calendar application 60 could return such address information to the event checker 42 in the TRD parameter responsive to receiving the query. That address information, along with any other data that is returned from the calendar application 60, may then be utilized to populate certain fields in the autoreply message being generated and/or to reflect the activities of the user, as stated above.

As stated previously, the present disclosure allows for performing one or more predefined actions in response to receiving an inbound email message. More particularly, the email application 40, in one embodiment, may be configured to perform multiple actions with respect to an incoming email message based on whether predetermined conditions are held true at the time of processing.

Figure 5:
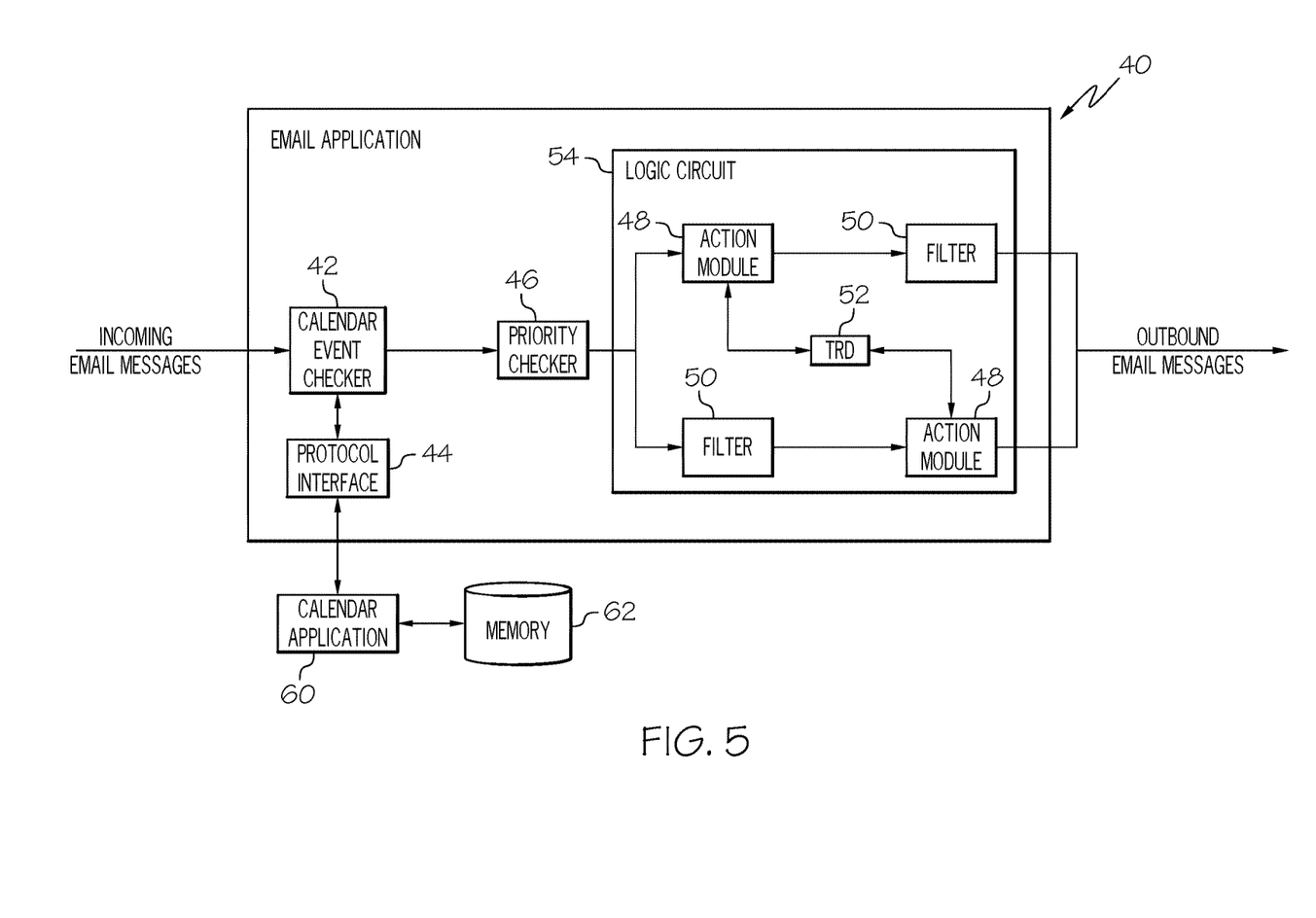
FIG. 5 is a block diagram illustrating some of the functional components that comprise an email application configured according to another embodiment of the present disclosure.

For example, the embodiment seen in FIG. 5 illustrates some functional components of the email application 40. The components seen in FIG. 5 are functionally similar to those seen in FIG. 3; however, in this embodiment, the email application 40 may also comprise a logic circuit 54 that processes the data received from the priority checker 46 prior to calling the action module 48 to perform an action.

More specifically, the logic circuit 54 may determine whether one or more conditions are held true, and based on that analysis, call the action module 48 to selectively perform one or more actions. By way of example only, the logic circuit 54 may perform its function as follows:

IF (Incoming Email is from User A)
    THEN Send Autoreply Message with Content "ABC";
        Forward email to User B;
        ELSE Move incoming email message to Folder 1;
END IF Thus, the logic circuit 54 may call the action module 48 to selectively perform different multiple actions based on an analysis of the incoming email message, and on whether a predetermined condition is satisfied based on that analysis.

In another embodiment, the logic circuit 54 may be configured to process the incoming email with respect to a nested set of conditions, and then to call the action module 48 to selectively perform one or more actions on the incoming email message. By way of example, the logic circuit 54 may be configured according to the following logic.

IF (incoming email message is from User A)
    THEN Send Autoreply message with content "ABC";
        Forward email message to User B;
        ELSE IF (incoming email message is URGENT)
            Send Autoreply message with content "DEF";
        ELSE Send Autoreply message with content "XYZ"
END IF Those of ordinary skill in the art should readily appreciate that, while FIG. 5 illustrates a logic circuit 54, which may be, for example, a processor circuit as, the present disclosure is not so limited. The functions described herein with respect to the logic circuit 54 may be performed by the action module 48, the priority checker 46, or both.

Figure 6:
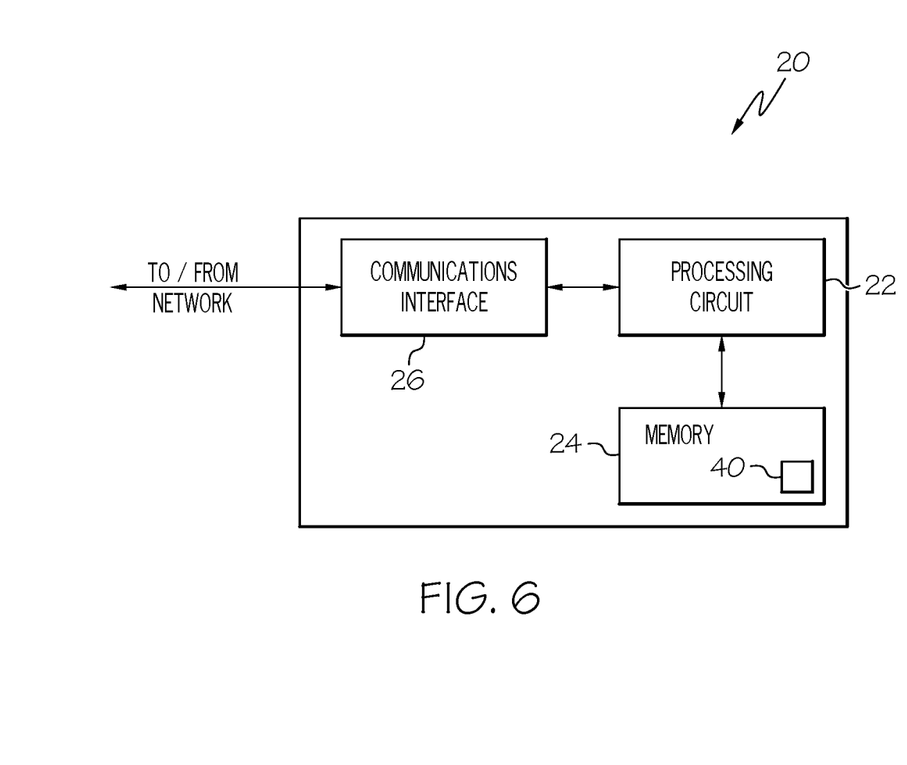
FIG. 6 is a block diagram illustrating some functional components of a computing device configured to function according to one embodiment of the present disclosure.

FIG. 6 is a block diagram illustrating some of the components of a server 20 configured according to one or more aspects of the present disclosure. It should be noted that while FIG. 5 and the previous embodiments discuss the present disclosure in the context of being performed at a network server 20, this is for illustrative purposes only. The method of the present disclosure may, in some embodiments, be performed at a user terminal 14, 16.

As seen in FIG. 5, server 20 comprises a processor circuit 22, a memory 24, and a communications interface 26. Although not specifically seen in the figure, those of ordinary skill in the art will readily appreciate that server 20 may comprise other components such as various user input/output (I/O) components that allow an operator or administrator, for example, to interact with server 20. Such components include, but are not limited to, a display monitor, a keyboard, a mouse, or other user input/output device.

The processor circuit 22 may be implemented, for example, as one or more programmable microprocessors, hardware, firmware, or a combination thereof. The processor circuit 22 generally controls the operation and functions of the server 20 according to logic and instructions and data stored in memory 24. Such operations and functions include, but are not limited to, executing the email application 40 on server 20 receive inbound email messages, interface with a calendar application program 60 to determine whether there are any currently active events associated with the user, and generate and send autoreply messages to contain information retrieved from the calendar application 60, as previously described.

The memory 24 may comprise any non-transitory, solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media. The memory 24 stores programs and instructions, such as email application 40, which when executed by the processor circuit 22, control the processor circuit 22 to perform the functions previously described.

The communications interface 26 comprises, for example, an ETHERNET interface. Communications interface 26 allows server 20 to communicate data and messages with the user terminals 14, 16, such as email messages, as well as with other servers in network 10, using any of a variety of well-known and well-documented protocols, such as TCP/IP, for example. Other communication interfaces not specifically mentioned herein are also possible.

As stated above, embodiments of the present disclosure may be utilized to generate and send an autoreply email message to a send of a received email message. However, those of ordinary skill in the art will readily appreciate that the present disclosure is not so limited. In fact, the present disclosure may be utilized to perform other actions in addition to, or in lieu of, autoreply generation, as seen in the following, non-exhaustive list.

Move the inbound email message to the inbox folder (this may be a default action for the user, if desired).

Assign the inbound email message to a predefined event types (e.g., VACATION, MEETING, COMMUTE, etc.).

Delete the inbound email message (i.e., move the inbound email message to the trash folder).

Permanently delete the inbound email message (i.e., move the inbound email message to the trash folder and then empty the trash folder).

Forward the inbound email message to a predefined person or group of persons.

Forward the inbound email message to a person or group of persons as an attachment.

Redirect the inbound email message to a person or group of persons.

Flag the inbound email message.

Clear the flag from the inbound email message.

Clear the event type indicator from the inbound email message.

Mark the inbound email message as urgent.

Print the inbound email message.

Launch a predefined application upon receipt of the inbound email message. The application may be identified in TRD 52 and/or in the data retrieved from the calendar application 60.

Mark the inbound email message as read.

Run a script file.

Perform a custom action (e.g., defined by a macro) upon receipt of the inbound email message.

Display a predefined message in an alert sent to the desktop of the user, and/or to another predetermined device.

Additionally, the filter 50 may be configured to filter the inbound email messages based on any desired predefined criteria before or after performing one or more of the above-mentioned actions. Some examples of the filter criteria are identified in the following non-exhaustive list.

The inbound email message is from a specific person.

The inbound email message has a specific subject.

The inbound email message was sent to a specific user or group.

The inbound email message has a specific word in the subject line or message body.

The inbound email message identifies the user in the "TO" line and/or CC line.

The inbound email message is a meeting invitation or an update to an already scheduled meeting.

The inbound email message is an autoreply email message from another person.

The inbound email message is assigned to a specific category.

The inbound email message includes specific predefined words in the header of the email message, and/or in the recipient address or sender address parts of the inbound email message.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method, comprising:
   receiving, at an email application executing on a computing device, an incoming email message sent to a user;
   in response to receiving the incoming email message, retrieving, by the email application, information associated with scheduled events currently active for the user, including by:
      generating a message to be sent to a calendar application associated with the user, wherein the message is generated in a format associated with the calendar application, wherein the format associated with the calendar application is different than a format associated with the email application; and
      sending the message to the calendar application, wherein the message requests information on currently active events for the user;
   receiving, by the email application from the calendar application, a response message that includes event information for a currently active event for the user;
   based on the currently active event, selecting, by the email application, a predetermined action to be performed by the email application when processing the incoming email message; and
   processing the incoming email message, including by performing the predetermined action.

2. The method of claim 1 wherein the event information further comprises an event identifier, and wherein the selecting the predetermined action includes determining whether there are any scheduled events currently active for the user based on the event identifier.

3. The method of claim 2, wherein the event information further comprises an event type identifier identifying the currently active event as being one of a single event type or a group event type, and wherein the predetermined action is selected further based on the event type identifier.

4. The method of claim 1, wherein the event information further comprises a data indicator identifying data associated with the predetermined action to be performed, and wherein performing the predetermined action includes performing the predetermined action using the data identified by the data indicator.

5. The method of claim 1, wherein the event information further comprises a priority indicator indicating a priority for performing the predetermined action; wherein the method further comprises:
   based on one or more properties of the incoming email message, selecting, by the email application, a filter to apply to the incoming email message; and
   determining a prioritized execution order for the predetermined action and the filter, including by determining which of the predetermined action and the filter to execute first based on the priority indicator.

6. The method of claim 1 wherein the performing the predetermined action comprises:
   determining whether a predetermined condition is satisfied; and
   selectively executing a plurality of actions if the predetermined condition is satisfied.

7. The method of claim 1, wherein the calendar application is executing on the computing device.

8. A computing device, comprising:
   a communication interface circuit configured to receive an incoming email message sent to a user, wherein an email application executing on the computing device is communicatively interfaced to a calendar application associated with the user;
   a processor; and
   a non-transitory, computer-readable medium having instructions stored thereon that are executable by the processor to cause the email application to:
      in response to receiving the incoming email message, retrieve, from the calendar application, information associated with scheduled events currently active for the user, including by:
         generating a message to be sent to the calendar application, wherein the message is generated in a format associated with the calendar application, wherein the format associated with the calendar application is different than a format associated with the email application; and
         sending the message to the calendar application, wherein the message requests information on currently active events for the user;
      receive, from the calendar application, a response message that includes event information for a currently active event for the user;
      based on the currently active event, select a predetermined action to be performed by the email application when processing the incoming email message; and
      process the incoming email message, including by performing the predetermined action.

9. The computing device of claim 8, wherein the event information further comprises an event identifier, and wherein selecting the predetermined action includes determining whether there are any scheduled events currently active for the user based on the event identifier.

10. The computing device of claim 9, wherein the event information further comprises an event type identifier identifying the currently active event as being one of a single event type or a group event type, and wherein the predetermined action is further selected based on the event type identifier.

11. The computing device of claim 8, wherein the event information further comprises a data indicator identifying data associated with the predetermined action to be performed, and wherein performing the predetermined action includes performing the predetermined action using the data identified by the data indicator.

12. The computing device of claim 8, wherein the event information further comprises a priority indicator indicating a priority for performing the predetermined action, wherein the instructions are further executable by the processor to cause the email application to:
   based on one or more properties of the incoming email message, select a filter to apply to the incoming email message; and
   determine a prioritized execution order for the predetermined action and the filter based on the priority indicator.

13. The computing device of claim 8, wherein performing the predetermined action comprises:
   determining whether a predetermined condition is satisfied; and selectively executing a plurality of actions if the predetermined condition is satisfied.

14. non-transitory, computer-readable medium having instructions stored thereon that are executable by a computing device to perform operations comprising:
- receiving, at an email application executing on the computing device, an incoming email message sent to a user;
- in response to receiving the incoming email message, retrieving information associated with scheduled events currently active for the user, including by:
  - generating a message to be sent to a calendar application associated with the user, wherein the message is generated in a format associated with the calendar application, wherein the format associated with the calendar application is different than a format associated with the email application; and
  - sending the message to the calendar application, wherein the message requests information on currently active events for the user;
- receiving, from the calendar application, a response message that includes event information for a currently active event for the user;
- based on the currently active event, selecting a predetermined action to be performed by the email application when processing the incoming email message; and
- processing the incoming email message, including by performing the predetermined action.

15. The non-transitory, computer-readable medium of claim 14, wherein the event information further comprises an event identifier, and wherein the selecting the predetermined action includes determining whether there are any scheduled events currently active for the user based on the event identifier.

16. The non-transitory, computer-readable medium of claim 15, wherein the event information further comprises an event type identifier identifying the currently active event as being one of a single event type or a group event type, and wherein the selecting the predetermined action is further based on the event type identifier.

17. The non-transitory, computer-readable medium of claim 14, wherein the event information further comprises a data indicator identifying data associated with the predetermined action to be performed, and wherein the operations further comprise performing the predetermined action using the data identified by the data indicator.

18. The non-transitory, computer-readable medium of claim 14, wherein the event information further comprises a priority indicator indicating a priority for performing the predetermined action, wherein the operations further comprise:
- based on one or more properties of the incoming email message, select a filter to apply to the incoming email message; and
- determine a prioritized execution order for the predetermined action and the filter, including by determining which of the predetermined action and the filter to execute first based on the priority indicator.

* * * * *